April 1, 1941.  O. TUXEN  2,237,093
OPTICAL TUNING INDICATOR FOR RADIO SETS
Filed March 19, 1940
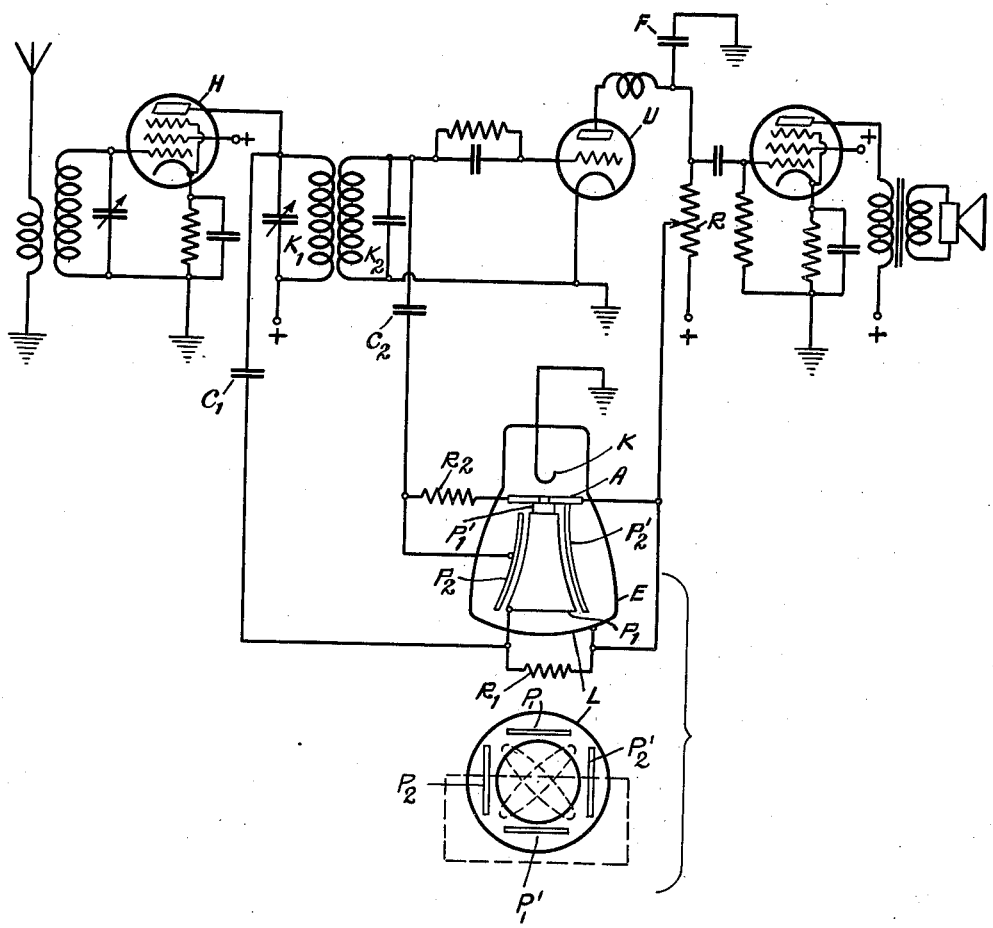
Inventor
*Otto Tuxen,*
By
*H.S. Srover*
Attorney Patented Apr. 1, 1941

2,237,093

UNITED STATES PATENT OFFICE 2,237,093

OPTICAL TUNING INDICATOR FOR RADIO SETS

Otto Tüxen, Berlin, Germany, assignor to Telefunken Gesellschaft für Drahtlose Telegraphie m. b. H., Berlin, Germany, a corporation of Germany Application March 19, 1940, Serial No. 324,758
In Germany January 20, 1939

5 Claims. (Cl. 250—40)

It is known in the art that optical tuning indicators of the so-called "magic eye" type furnished in radio receiving sets may be operated in such a way that they indicate the phase resonance curve rather than the amplitude resonance curve. When passing through the resonance point the former exhibits a maximum change, while the amplitude resonance curve at the said point exhibits only a flat or broad-topped crest or maximum which is more difficult to observe.

In a certain arrangement of this kind which is predicated upon the fact that in the presence of precise resonance of a two-circuit band-pass filter of the receiver or signal channel there arises a quadrature relationship between the potentials of the two circuits. A D. C. potential is produced by means of a push-pull rectifier device, the said potential, in the presence of correct tuning, being equal to zero, while being either positive or negative according to the sense or direction of detuning. The said D. C. potential serves for the deflection of an electron-ray pencil of an electron-ray tube.

The phase displacement between primary potential and secondary potential of a band-pass filter could also be indicated in a still simpler manner, without the use of a push-pull rectifier device by impressing the two potentials upon two pairs of plates of an electron-ray tube, with the said pairs of tube plates being mounted at an angle of 90 degrees in respect to each other. In the presence of resonance, there would then result a circle or an upright ellipse, while in the lack of resonance, the pattern would be an ellipse tilted more or less to either one of the two sides. However, such an arrangement has not been practicable in the past for the reason that the size of these patterns is a function of the RF amplitude. In the case of a powerful incoming station signal the deflections and thus the ensuing patterns are so large that in certain circumstances the screen may be inadequately small, unless it is given a size usually unsuited for broadcast receiver sets. This drawback inhering in the dependence upon the amplitude, however, makes itself felt in case of modulation of the incoming station since the patterns or figures vary with the envelope of the sending amplitude in their size so that the user of the radio set gets the impression of very broad, blurred figures of little brilliance, with the result that exact reading is impossible.

According to this invention the speed of the electron-ray pencil is automatically regulated as a function of the RF amplitude so that the amount of the deflection and thus the size of the figures or patterns appearing upon the luminescent screen are practically independent of the RF amplitude.

Now, the invention could first be carried into practice in such a way that the D. C. potential resulting from rectification and filtering of the superposed modulation frequency is employed for the acceleration of the electron-ray pencil. In fact, this results in a condition where the various signal field intensities of different stations no longer play an essential part. For a sending station whose signal comes in very strong, the resultant patterns or figures would be of the same size as for a feeble station signal; indeed, they would only turn out to be slightly brighter. However, the preferable procedure according to a further object of the invention and its basic idea is to permit the accelerator or gun potential to vary at the rate of the AF modulation frequency. As a matter of fact, in this case the influence of the RF amplitude varying with the modulation would be compensated so that the patterns upon the luminescent screen appear in the form of very sharply bounded lines of very great brilliance, and this affords precise readings.

An exemplified embodiment of the invention is illustrated in the appended drawing showing the circuit organization of a three-circuit tuned radio frequency type of radio receiver comprising grid-current detection and single-stage AF amplification, although it will be understood that the invention is also applicable to receivers of the superheterodyne type. Between the RF amplifier tube H and the grid-current detector tube U is inserted a two-circuit tunable band-pass filter K1, K2. The RF potentials set up at the two circuits are fed through blocking condensers C1 and C2 to the pairs of deflector plates P1 and P2 of the cathode-ray or Braun tube E, the said plates not being grounded for RF and being disposed at right angles to each other. The corresponding cooperating plates P'1 and P'2 are directly connected conductively with the perforated anode A and connected, like the conducting luminescent screen L of the tube to a suitably chosen tap of the anode load resistance R of the grid-current detector tube U.

Inasmuch as the RF had been filtered out by the filter F, it follows that the potential at the electrodes A, P'1, P'2 and L in respect to the grounded cathode K varies in accordance with the amplitude of the incoming RF, that is, the potential will be so much more positive, the higher the signal amplitude. The plates P1 and P2 are connected with the same potential through uncoupling resistances R1, R2, so that deflection is effected solely by the RF potentials prevailing in the two circuits.

In the presence of precise resonance, a circuit will appear upon the luminescent screen L (provided the potentials prevailing in the circuits are roughly alike). In detuned condition, there appears a narrow ellipse which assumes a more or less sloped or tilted position, that is, either to the left or to the right-hand side, according to the sense of the detuning or want of tuning. The lower or the upper half of the pattern or even a still larger portion thereof, if desired, and as indicated in the drawing by the dash-line, may be concealed or covered (or not be effective at all); hence, it is possible to clearly judge from the lateral shift of the visible portions of the ellipse in which sense the detuning is.

To the end of enhancing the deflection sensitivity (or deflectibility) it may in certain cases be advisable to impress the anode A with a lower potential or even, if desired, a fixed potential, while the screen is impressed with a potential which in the mean is more positive and which will vary with the envelope of the RF oscillation.

In cases where the automatic volume control in a receiver set is so perfect that the RF amplitudes at the band-pass filters K1, K2 for all stations turn out to be of equal size and vary only with the modulation, it will be found sufficient to modulate the accelerator potential for the electron-ray pencil only by the AF signal wave so that the lines will stay sharp.

What I claim is:

1. A system for visually indicating the condition of exact tuning in a radio receiver provided with circuits carrying high frequency signal currents followed by a detector, comprising a cathode ray tube having means for developing an electron beam, an accelerating anode, a fluorescent screen and a plurality of deflecting electrodes, means for impressing high frequency potentials on certain of said deflecting electrodes, said high frequency potentials being in phase quadrature only in the presence of exact tuning and being derived from the signal carrying circuits, and means for impressing upon the accelerating anode, fluorescent screen and certain of the deflecting electrodes a potential varying with the audio frequency output of the detector.

2. A system for visually indicating the condition of exact tuning in a radio receiver provided with circuits carrying high frequency signal currents followed by a detector, comprising a cathode ray tube having means for developing an electron beam, an accelerating anode, a fluorescent screen and a plurality of deflecting electrodes adjacent ones of which are arranged at right angles to each other, means for impressing high frequency potentials on only two adjacent deflecting electrodes, said high frequency potentials being in phase quadrature only in the presence of exact tuning and being derived from the signal carrying circuits, and means for impressing upon the accelerating anode, fluorescent screen and each of the deflecting electrodes a potential varying with the audio frequency output of the detector.

3. A system for visually indicating the condition of exact tuning in a radio receiver provided with circuits carrying high frequency signal currents followed by a detector, comprising a cathode ray tube having means for developing an electron beam, an accelerating anode, a fluorescent screen and a plurality of deflecting electrodes adjacent ones of which are arranged at right angles to each other, means for impressing high frequency potentials on only two adjacent deflecting electrodes, said high frequency potentials being in phase quadrature only in the presence of exact tuning and being derived from the signal carrying circuits, and means for impressing upon the accelerating anode, fluorescent screen and each of the deflecting electrodes a potential varying with the audio frequency output of the detector, said potential being applied to the aforementioned two adjacent electrodes each through a resistance.

4. A system for visually indicating the condition of exact tuning in a radio receiver including a pair of coupled tuned circuits and a detector, comprising a cathode ray tube having means for developing an electron beam, an accelerating anode, a fluorescent screen, first and second pairs of oppositely disposed deflecting electrodes, a connection from the first tuned circuit for impressing a radio frequency potential upon one of the deflecting electrodes of the first pair, a connection from the other tuned circuit for impressing a radio frequency potential upon one of the deflecting electrodes of the second pair such that in the presence of sharp tuning said radio frequency potentials are in phase quadrature and the image produced on the screen by the electron beam is a circle, the size of said image tending to vary with change in amplitude of the received signal, and means whereby the size of the image is made invariable irrespective of the received signal amplitude, comprising a connection for impressing a potential derived from the output of the detector upon the accelerating anode, fluorescent screen and the several deflecting electrodes.

5. A system as defined in claim 4 wherein the detector is of the grid leak type, and the potential is derived from a variably tapped resistance in the output of the detector.

OTTO TÜXEN.